(12) United States Patent
Ishii et al.

(10) Patent No.: US 6,253,174 B1
(45) Date of Patent: *Jun. 26, 2001

(54) SPEECH RECOGNITION SYSTEM THAT RESTARTS RECOGNITION OPERATION WHEN A NEW SPEECH SIGNAL IS ENTERED USING A TALK SWITCH

(75) Inventors: Kazuo Ishii, Kanagawa; Eiji Yamamoto, Saitama; Miyuki Tanaka, Tokyo; Hiroshi Kakuda; Yasuharu Asano, both of Kanagawa; Hiroaki Ogawa, Tokyo; Masanori Omote, Kanagawa; Katsuki Minamino, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,826

(22) Filed: Jul. 1, 1998

Related U.S. Application Data

(62) Division of application No. 08/731,158, filed on Oct. 10, 1996, now Pat. No. 6,067,521.

(30) Foreign Application Priority Data

Oct. 16, 1995 (JP) .................................................. 7-267540
Oct. 16, 1995 (JP) .................................................. 7-267541

(51) Int. Cl.[7] .................................................. G10L 15/00
(52) U.S. Cl. .......................... 704/231; 704/275; 704/251
(58) Field of Search .................................. 704/231, 251, 704/258, 275

(56) References Cited

U.S. PATENT DOCUMENTS

| | | | |
|---|---|---|---|
| 3,928,724 | * 12/1975 | Byram et al. | 704/275 |
| 4,677,569 | * 6/1987 | Nakano et al. | 704/275 |
| 4,928,302 | * 5/1990 | Kneuchi et al. | 704/275 |
| 5,231,670 | * 7/1993 | Goldhor et al. | 704/275 |
| 5,247,705 | * 9/1993 | Attig et al. | 704/275 |

OTHER PUBLICATIONS

Holzer et al., "Talk Show", PC Magazine, Dec. 20, 1994, pp. 203–219.*

* cited by examiner

*Primary Examiner*—David D. Knepper
(74) *Attorney, Agent, or Firm*—Jay H. Maioli

(57) ABSTRACT

A speech recognition system for use in an automobile navigation system performs speech processing for recognizing speech or spoken words that correspond to a name of a place and a word designating a desired operation of the navigation system. When a new audio signal is input during speech recognition processing of a previously input audio signal, by holding a talk switch down for a fixed time period, the processing of the previously input audio signal is canceled, and the new audio signal immediately undergoes speech recognition processing without requiring any continuation of the processing of the previously input audio signal. The speech recognition system also determines whether an input audio signal has been reinputted within a predetermined amount of time from when the audio signal was previously inputted.

8 Claims, 11 Drawing Sheets

FIG. 5

| Urban And Rural Prefectures | Cities, Wards, Towns And Villages Names | Longitude | Latitude | Display Scale |
|---|---|---|---|---|
| Hokkaido | Akabira City<br>Asahikawa City<br>--------- | | | |

SPEECH RECOGNITION SYSTEM THAT RESTARTS RECOGNITION OPERATION WHEN A NEW SPEECH SIGNAL IS ENTERED USING A TALK SWITCH

This is a division of prior application Ser. No. 08/731,158 filed Oct. 10, 1996 now U.S. Pat. No. 6,067,521 issued May 23, 2000.

BACKGROUND OF THE INVENTION

1. Field of the Invention

The present invention relates to a speech recognition apparatus and a speech recognition method suitably applied to a navigation apparatus mounted to e.g., a car for displaying a road map, etc., the navigation apparatus and a navigation method combined with this voice recognition apparatus, and a car for mounting these apparatuses thereon.

2. Description of the Prior Art

Various kinds of navigation apparatuses mounted onto a car, etc. have been developed. Each of these navigation apparatuses is constructed by a large capacity data memory means such as a CD-ROM storing e.g., road map data, a detecting means for detecting the present position of the car, and a displaying apparatus for displaying a road map in the vicinity of the detected present position on the basis of data read from the data memory means. In this case, the detecting means of the present position is constructed by using a position measuring system using an artificial satellite for a position measurement called a GPS (Global Positioning System), a self-contained navigation following up a change in the present position from a starting spot point on the basis of information such as a vehicle's running direction, a vehicle's running speed, etc.

A map displayed in the displaying apparatus is set such that a map in a desirable position can be displayed as well as the present position by performing a key operation, etc. as long as map data are prepared.

In the case of such a navigation apparatus, for example, in the case of the navigation apparatus for a car, the displaying apparatus is generally arranged in the vicinity of a driver seat such that a driver can see a map in the vicinity of the present position while the car is running and temporarily stops as in traffic signal stoppage, etc.

It is necessary to be able to operate such a navigation apparatus such that no navigation apparatus obstructs driving of the car, etc. For example, the navigation apparatus is constructed such that a complicated operation of the navigation apparatus is inhibited during the car driving. Namely, when such a navigation apparatus is arranged in a vehicle, the navigation apparatus is connected to a certain running state detecting section (e.g., a parking brake switch of the car). The navigation apparatus is set such that all operations of the navigation apparatus can be performed only when stoppage of the vehicle is detected by this running state detecting section, and a complicated key operation is inhibited in a nonstopping state (namely, during running of the vehicle).

However, it is inconvenient that no operation for switching display maps, etc. can be performed during such running. Accordingly, it is required that a high grade operation of the navigation apparatus can be performed without obstructing the driving of the vehicle even when the vehicle is running.

In such a case, it is considered that, for example, various kinds of commands are inputted by a speech input to operate the navigation apparatus. However, when incorrect commands are inputted through speech, etc., it is necessary to perform an operation for canceling the input by a key operation, etc. making it inconvenient to handle the navigation apparatus.

SUMMARY OF THE INVENTION

In consideration of such a problem, an object of the present invention is to be able to simply perform complex operations of various kinds of apparatuses such as a navigation apparatus, etc. without obstructing the driving of a car, etc.

BRIEF DESCRIPTION OF THE DRAWINGS

FIG. 5 is a diagram showing a memory area construction of a memory for longitude and latitude conversion in one embodiment.

DESCRIPTION OF THE PREFERRED EMBODIMENTS

One embodiment of the present invention will next be described with reference to the accompanying drawings.

Figure 1:
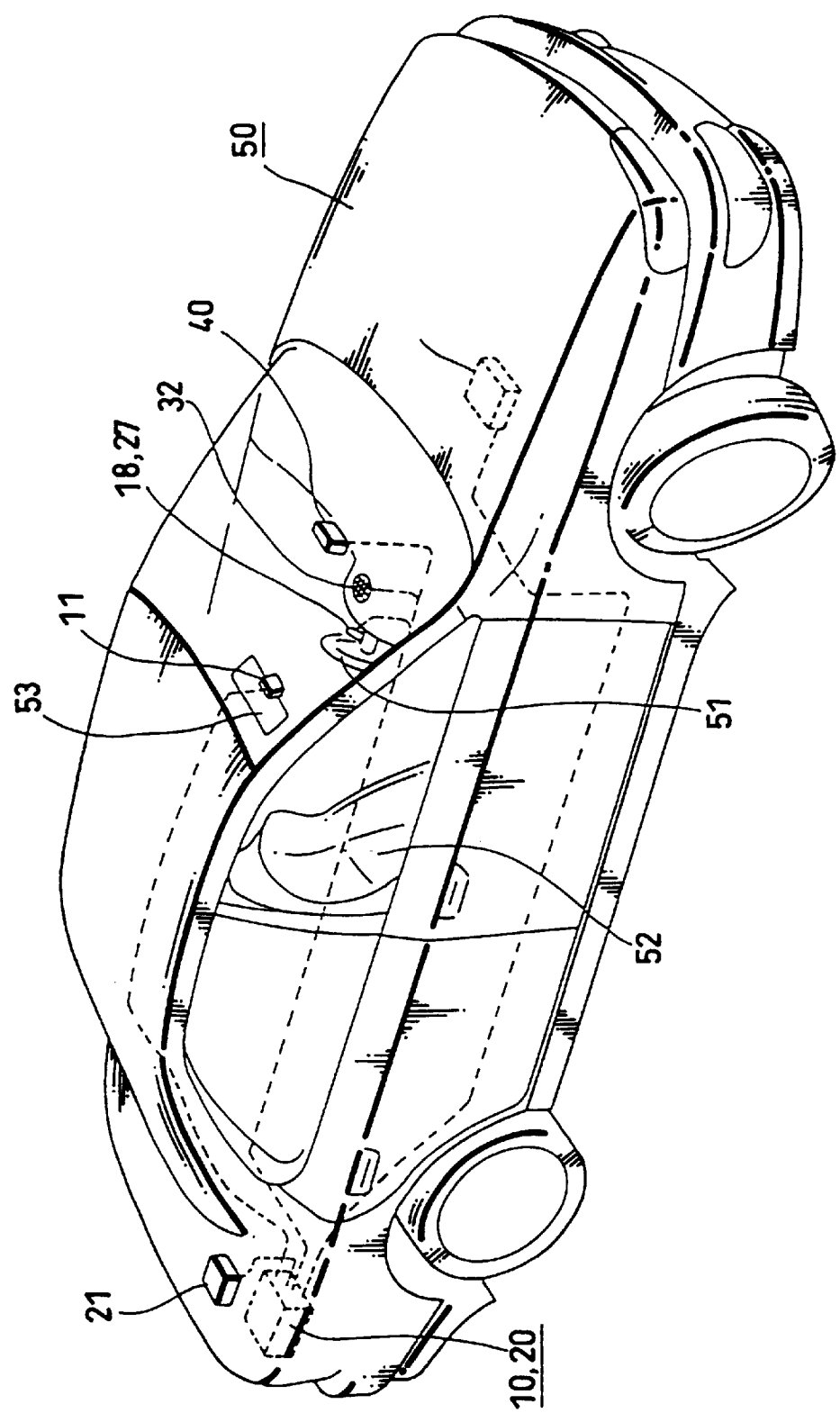
FIG. 1 is a perspective view showing a state in which an apparatus in one embodiment of the present invention is assembled into a car.

In this example, the present invention is applied to a navigation apparatus mounted to a car. An arranging state of the navigation apparatus mounted to the car in this example will first be explained with reference to FIGS. 1 and 2. As shown in FIG. 1, a steering wheel 51 of the car 50 is attached to a front portion of a driver seat 52 and a driver sitting on the driver seat 52 basically operates the navigation apparatus. However, there is also a case in which another fellow passenger within this car 50 operates the navigation apparatus. A body 20 of this navigation apparatus and a speech recognition apparatus 10 connected to this navigation apparatus body 20 are arranged in an arbitrary space (e.g., within a trunk of a rear portion) within the car 50. An antenna 21 for receiving a position measuring signal described later is attached onto the outer side of a car body (otherwise, within the car such as the inner side of a rear window, etc.).

Figure 2:
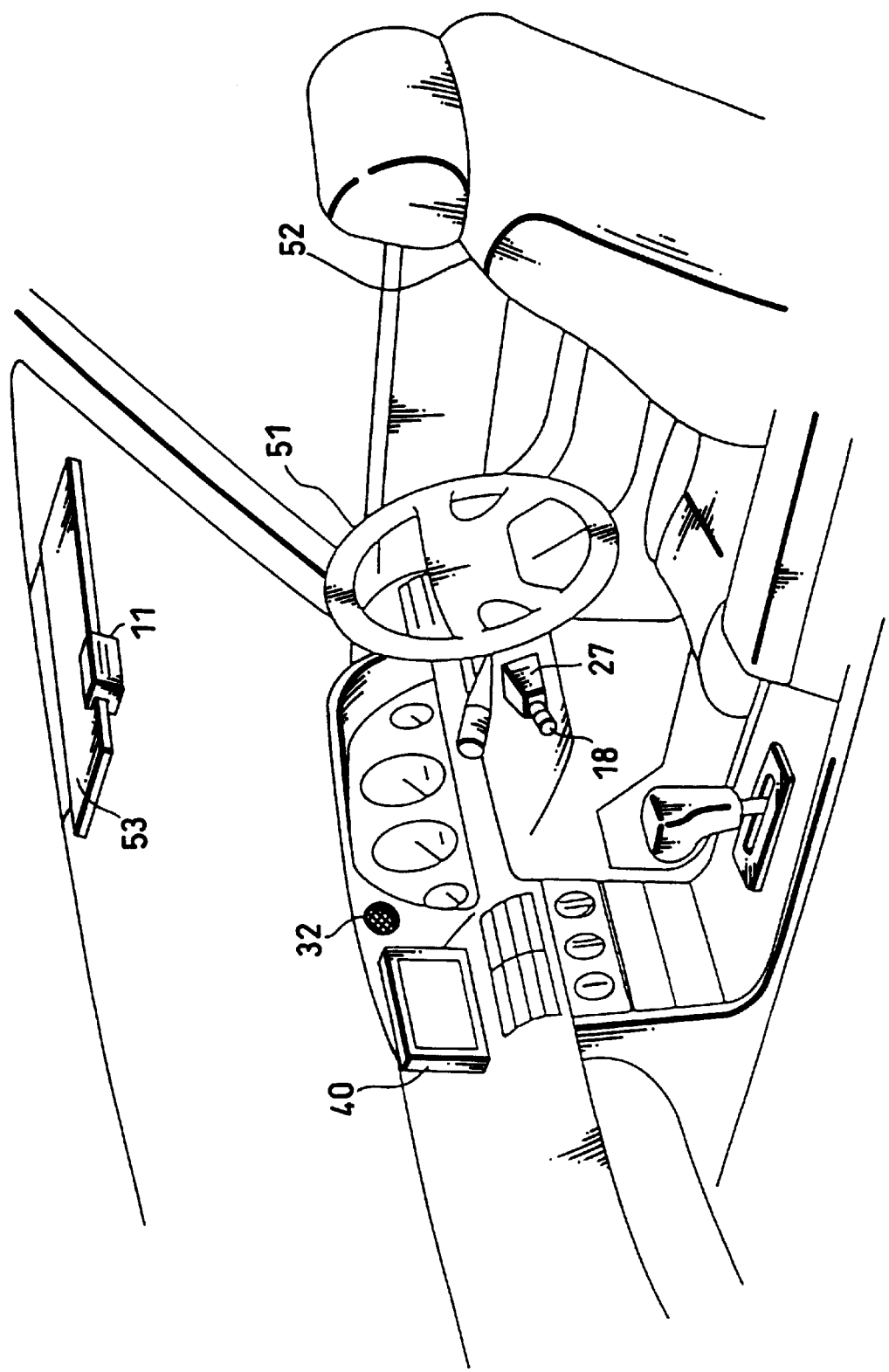
FIG. 2 is a perspective view showing a portion near a driver seat when the apparatus in one embodiment is assembled into the car.

As shown in the vicinity of the driver seat in FIG. 2, a talk switch 18 and an operation key 27 of the navigation apparatus described later are arranged on a side of the steering wheel 51 such that the talk switch 18 and the operation key 27 are operated without causing any obstruction during driving of the car. A displaying apparatus 40 connected to the navigation apparatus is also arranged in a position in which no field of view in front of the driver is obstructed. A speaker 32 for outputting an audio signal synthesized as speech within the navigation apparatus 20 is attached to the car in a position in which an output speech reaches the driver (e.g., on a side of the displaying apparatus 40, etc.).

Speech can be inputted to the navigation apparatus in this example. Therefore, a microphone 11 is attached to a sun visor 53 arranged in an upper portion of a front glass in front of the driver seat 52 so that the microphone 11 collects the speech of the driver sitting on the driver seat 52.

The navigation apparatus body 20 in this example is connected to a computer 54 for controlling the operation of an engine of this car so that a pulse signal proportional to a car speed is supplied from this computer 54 to the navigation apparatus body 20.

Figure 3:
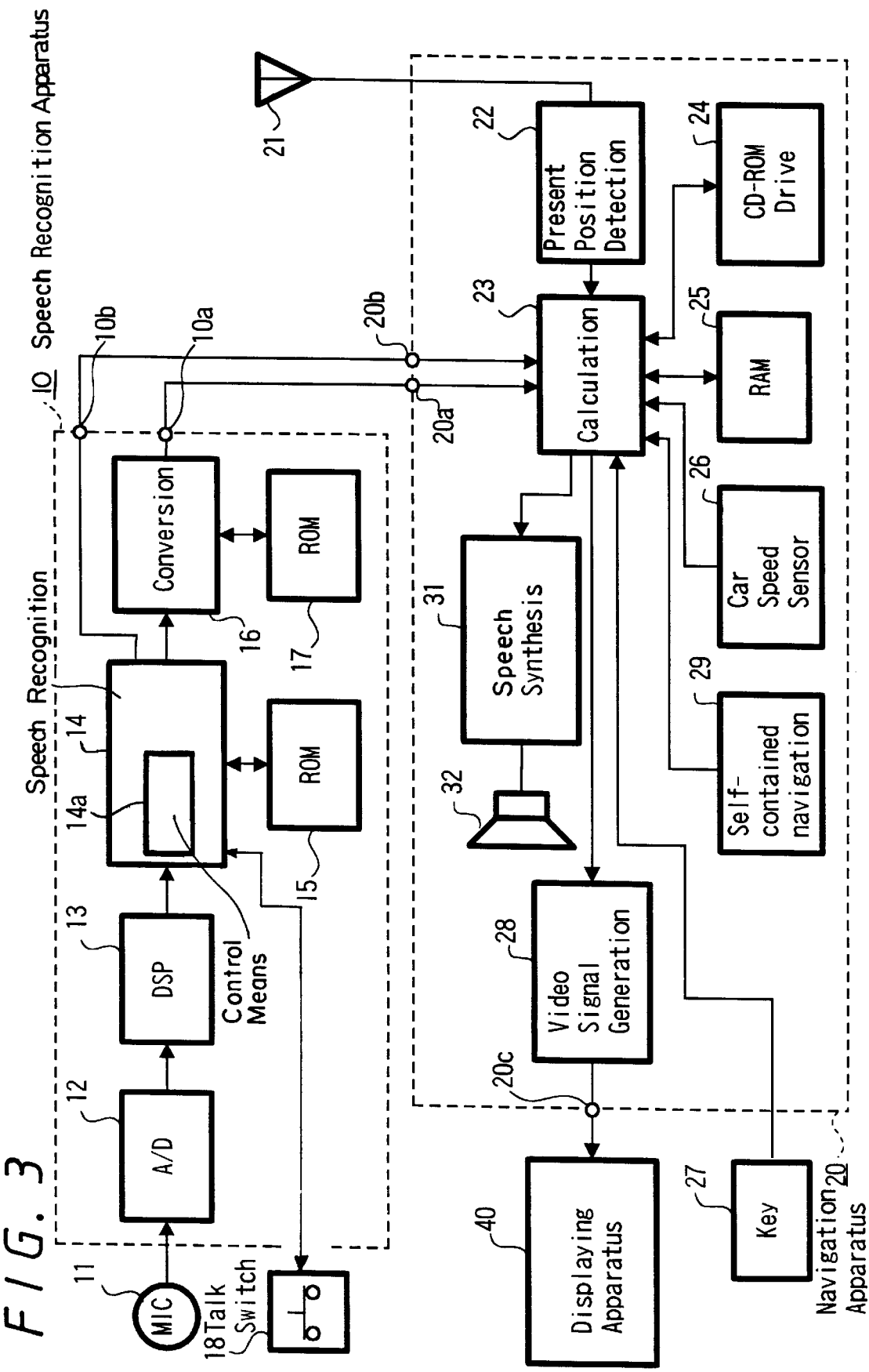
FIG. 3 is a schematic in block diagram form showing one embodiment of the present invention.

An internal construction of the navigation apparatus in this example will next be explained with reference to FIG. 3. In this example, the speech recognition apparatus 10 is connected to the navigation apparatus 20 and the microphone 11 is connected to the speech recognition apparatus 10. For example, directivity of this microphone 11 is set to be relatively narrow and the microphone 11 is constructed such that only speech of a person sitting on the driver seat of the car is preferably collected. For example, a power source of the navigation apparatus is turned on to collect the speech only while a talk switch 18 described later is pushed and turned on.

An audio signal collected by this microphone 11 is supplied to an analog/digital converter 12 and is converted to a digital audio signal of a predetermined sampling frequency. Then, the digital audio signal outputted from this analog/digital converter 12 is supplied to a digital speech processing circuit 13 constructed by an integrated circuit called a DSP (digital signal processor). In this digital speech processing circuit 13, the digital voice signal is set to vector data by processings such as band division, filtering, etc., and these vector data are supplied to a speech recognition circuit 14.

A ROM 15 for storing speech recognition data is connected to this speech recognition circuit 14 so that a recognizing operation is performed in accordance with a predetermined speech recognizing algorithm (e.g., HMM: hidden Markov model) with respect to the vector data supplied from the digital speech processing circuit 13. This ROM 15 then selects plural candidates from phonemic models for speech recognition stored to the ROM 15 and reads character data stored in accordance with a phonemic model having a highest conformity degree among these candidates. The speech recognition circuit 14 in this example also functions as a control means for controlling processing of each portion within the speech recognition apparatus 10 and judges an operation of the talk switch 18 described later.

Figure 4:
FIG. 4 is an a diagram showing a memory area construction of a memory for speech recognition in one embodiment.

Here, a data storing state of the ROM 15 for storing the speech recognizing data in this example will be explained. In the case of this example, only the name of a place and a word for designating an operation of the navigation apparatus are recognized. As shown in a setting state of a memory area in FIG. 4, only the names of domestic urban and rural prefectures, cities, wards, towns and villages are registered as the name of a place. A character code of this place name and a phonemic model as data for recognizing the place name as speech are stored to the memory area for each of the urban and rural prefectures, cities, wards, towns and villages.

For example, in the case of the interior of the country of Japan, the number of cities, wards, towns and villages in the whole country is about 3500 so that about 3500 place names are stored to the memory area. However, in the case of the place name of "xx town", both data showing the pronouncing case of "xx machi" and data showing the pronouncing case of "xx cho" are stored. Similarly, in the case of the place name of "xx village", both data showing the pronouncing case of "xx son" and data showing the pronouncing case of "xx mura" are stored.

The names of urban and rural prefectures tending to be mistaken are additionally registered with respect to the names of cities, wards, towns and villages having a high possibility that the names of urban and rural prefectures are incorrectly remembered such as cities, wards, towns and villages, etc. adjacent to boundaries of the urban and rural prefectures in position. Namely, for example, "Kawasaki city, Kanagawa prefecture" as a correct example is registered and "Kawasaki city, Tokyo Metropolis" as an incorrect example providing an adjacent name of each of the urban and rural prefectures is also registered.

Character codes of words for giving commands of various kinds of operations such as words designating display positions such as "destination", "starting spot", "routing spot", "one's own house", etc., "what time now" (a command for hearing the present time), "where now" (a command for hearing the present position), "next" (a command for hearing the next intersection), "how far from here" (a command for hearing a distance until the destination), "speed" (a command for hearing the present speed), "altitude" (a command for hearing the present altitude), "advancing direction" (a command for hearing an advancing direction), "list" (a command for displaying a list of recognizable commands in the displaying apparatus), etc., and others are stored as words for designating the operation of the navigation apparatus. Further, a phonemic model corresponding to each of these words is also stored.

When a character code corresponding to a phonemic model and conforming to recognized results obtained through a predetermined speech recognizing algorithm from input vector data is the character code of a place name in the speech recognition circuit 14, this character code is read from the ROM 15. This read character code is supplied to a longitude latitude converting circuit 16. A ROM 17 for storing longitude latitude converted data is connected to this longitude latitude converting circuit 16. Longitude and latitude data corresponding to the character data supplied from the speech recognition circuit 14 and their accompanying data are read from the ROM 17.

The speech recognition apparatus 14 in this example has a temporary memory 14a for temporarily storing recognized results in a temporary list of recognized speech within this temporary memory. Data up to speech conforming to a certain degree in an order from speech of a highest conformity degree are also stored as a candidate list at a recognition processing time. The temporary list of recognized speech and the candidate list are erased when a certain time has passed after these lists were stored.

Here, a data storing state of the ROM 17 for storing longitude latitude converted data in this example will be explained. In the case of this example, a memory area is set using the same character code as the character code of a place name stored in the ROM 15 for storing speech recognizing data. As shown in FIG. 5, latitude and longitude data of a place name shown by characters and data of a display scale as accompanying data are stored every character code. The character code read from the ROM 15 for storing speech recognizing data is set to a character code by a katakana (the square form of kana in Japanese). Character codes using Chinese characters for display, a hiragana (the cursive kana characters in Japanese), a katakana, etc. are also stored to this ROM 17 for storing longitude latitude converting data in addition to the character code by a katakana in which a pronunciation is shown by a character series.

In the case of this example, the latitude and longitude data every place name are set to latitude and longitude data showing an absolute position of the seat of a government office (a city office, a ward office, a town office, a village office) in a region shown by its place name. The character codes for display and data of a display scale are outputted as accompanying data together with the latitude and longitude data. These data of the display scale are set to data of the display scale set in accordance with the size of a region shown by its place name. For example, these data of the display scale are set to data designating the display scale at several stages.

The longitude and latitude data and their accompanying data read from the ROM 17 for storing longitude and latitude converting data are supplied to an output terminal 10a as an output of the speech recognition apparatus 10. Data of the character code of an input speech detected as conformity by the speech recognition circuit 14 are also supplied to the output terminal 10b as an output of the speech recognition apparatus 10. The obtained data of these output terminals 10a and 10b are supplied to the navigation apparatus 20.

A talk switch 18 as an unlocked open-close switch (namely, a switch attaining a turning-on state only when the switch is pushed) is connected to the speech recognition apparatus 10 in this example. When this talk switch 18 is continuously pushed for at least 300 msec or more, the above processing is performed with respect to an audio signal collected by the microphone 11 by circuits from the analog/digital converter 12 to a longitude latitude converting circuit 16. This processing within the speech recognition apparatus 10 is performed on the basis of control of the speech recognition circuit 14 and the speech recognition circuit 14 also judges a state of the talk switch 18.

When it is judged that the talk switch 18 is again pushed for a predetermined period by the speech recognition circuit 14 while the above-mentioned processing is executed by the circuits from the analog/digital converter 12 to the longitude latitude converting circuit 16, the processing executed at present within the speech recognition apparatus 10 is interrupted and the speech recognition processing is restarted with respect to an audio signal inputted for a period in which the talk switch 18 is newly pushed.

Further, when the recognition processing of speech is repeated within a predetermined time (e.g., within 10 seconds) in the speech recognition circuit 14, speech previously recognized at this time is deleted from the temporary list of recognized speech stored in a memory within the speech recognition circuit 14, and it is judged whether speech stored in a highest order of the deleted hysteresis list is recognized. When such processing is continuously performed plural times (e.g., 5 times), data of the recognized speech as a candidate is read from the candidate list and is supplied to the navigation apparatus 20. The candidate list is displayed in the displaying apparatus 40 connected to the navigation apparatus 20. Detailed contents of these processings will be described later.

Various kinds of control data except for the above-mentioned character codes can be also transmitted to the navigation apparatus 20 through the terminal 10b from the speech recognition circuit 14 within the speech recognition apparatus 10 in this example. For example, there is a case in which control data for interrupting speech output processing and processing for making map data are transmitted to the navigation apparatus 20.

The construction of the navigation apparatus 20 connected to the speech recognition apparatus 10 will next be explained. This navigation apparatus 20 has an antenna 21 for a GPS. A signal for a position measurement from a satellite for the GPS received by this antenna 21 is received and processed by a present position detecting circuit 22. The present position of the navigation apparatus is detected by analyzing these received data. Data of the detected present position are latitude and longitude data in an absolute position at this time.

The data of the detected present position are supplied to an arithmetic circuit 23. This arithmetic circuit 23 functions as a system controller for controlling the operation of the navigation apparatus 20. The arithmetic circuit 23 is connected to a CD-ROM driver 24, a RAM 25, a car speed sensor 26 and an operation key 27. In the CD-ROM driver 24, a CD-ROM (an optical disk) storing road map data thereto is set and the CD-ROM driver 24 reads stored data of this CD-ROM. The RAM 25 stores various kinds of data required for data processing. The car speed sensor 26 detects the movement of the vehicle where this navigation apparatus is mounted thereon. When longitude and latitude coordinate data in the present position, etc. are obtained, the arithmetic circuit 23 controls a reading operation for reading the road map data in the vicinity of its coordinate position to the CD-ROM driver 24. The arithmetic circuit 23 then makes the RAM 25 temporarily store the road map data read by the CD-ROM driver 24 and makes display data for displaying a road map by using these stored road map data. At this time, these display data are set to display data for displaying the map by a display scale (a reduced scale) set by an operation of the operation key 27 arranged in a predetermined position within the car, etc.

The display data made by the arithmetic circuit 23 are then supplied to a video signal generating circuit 28. A video signal of a predetermined format is generated by this video signal generating circuit 28 on the basis of the display data. This video signal is supplied to an output terminal 20c.

The video signal outputted from this output terminal 20c is then supplied to a displaying apparatus 40 and image receiving processing based on the video signal is performed by this displaying apparatus 40. Thus, the road map, etc. are displayed on a display panel of the displaying apparatus 40.

In addition to the display of such a road map in the vicinity of the present position, a road map, etc. in a position designated by the operation of the operation key 27, etc. can be set to be displayed on the basis of the control of the arithmetic circuit 23. Further, a specific coordinate position such as "destination", "starting spot", "routing spot", "one's own house", etc. can be set to be registered on the basis of the operation of the operation key 27, etc. When this specific coordinate position is registered, data (longitude and latitude data) in this registered coordinate position are stored to the RAM 25.

When the car speed sensor 26 detects running of the car, the arithmetic circuit 23 is set such that no operation except for a relatively simple operation within the operation of the operation key 27 is received.

This navigation apparatus 20 also has a self-contained navigation section 29. The navigation apparatus 20 calculates an exact running speed of the car on the basis of a pulse signal corresponding to a car speed and supplied to the computer for engine control, etc. on a car side. The navigation apparatus 20 also detects an advancing direction of the car on the basis of an output of a gyro sensor arranged within the self-contained navigation section 29. The navigation apparatus 20 then measures the present position of the car by the self-contained navigation from a position determined on the basis of the car speed and the advancing direction. For example, when the present position detecting circuit 22 attains a state unable to detect the car position, the car position is measured by the self-contained navigation from a car position finally detected by the present position detecting circuit 22.

A speech synthesizer circuit 31 is also connected to the arithmetic circuit 23. When any designation using speech is required in the arithmetic circuit 23, the speech synthesizer circuit 31 executes synthesizing processing of this designated speech and the speech is set to be outputted from the speaker 32 connected to the speech synthesizer circuit 31. For example, various kinds of designations required for the navigation apparatus such as "Car approaches destination", "Advancing direction is left", etc. are given through voices. Further, in this speech synthesizer circuit 31, speech recognized by the speech recognition apparatus 10 is set to be synthesized on the basis of supplied character data and outputted as speech from the speaker 32. This speech synthesize processing will be described later.

Here, this navigation apparatus 20 has input terminals 20a and 20b. The longitude and latitude data, their accompanying data and the data of a character code outputted from the output terminals 10a and 10b of the voice recognition apparatus 10 are supplied to the input terminals 20a and 20b. The longitude and latitude data, their accompanying data and the character code data obtained at these input terminals 20a and 20b are supplied to the arithmetic circuit 23.

When these longitude and latitude data, etc. are supplied from the speech recognition apparatus 10, the arithmetic circuit 23 performs a reading control operation for reading road map data in the vicinity of the longitude and latitude from a disk by the CD-ROM driver 24. Then, the arithmetic circuit 23 makes the CD-ROM driver 24 temporarily store the read road map data to the RAM 25 and makes display data for displaying a road map by using these stored road map data. At this time, the display data are set to display data displayed with the supplied longitude and latitude as a center and are also set to display data for displaying the map by a scale (reduced scale) designated by the display scale accompanied with the longitude and latitude data.

A video signal is generated by the video signal generating circuit 28 on the basis of these display data. The displaying apparatus 40 displays a road map in a coordinate position designated from the speech recognition apparatus 10.

When the character code of a word for designating the operation of the navigation apparatus is supplied from the output terminal 10b of the speech recognition apparatus 10 and is discriminated by the arithmetic circuit 23, the arithmetic circuit 23 performs corresponding control. In this case, when this character code is the character code of a word for designating a display position such as "destination", "starting spot", "routing spot", "one's own house", etc., it is judged whether a coordinate in this display position is registered to the RAM 25 or not. Thereafter, when this coordinate is registered to the RAM 25, the CD-ROM driver 24 performs a reading control operation for reading road map data of the vicinity of this display position from a disk.

When data of a character code showing the pronunciation of a recognized speech are supplied from the speech recognition apparatus 10 to the arithmetic circuit 23, a word shown by this character code is synthetically processed by the speech synthesizer circuit 31 and is outputted as speech from the speaker 32 connected to the speech synthesizer circuit 31. For example, when "Bunkyo ward, Tokyo Metropolis" is recognized as speech on a side of the speech recognition apparatus 10, the voice synthesizer circuit 31 performs synthetic processing for generating an audio signal for pronouncing "Bunkyo ward, Tokyo Metropolis" on the basis of data of a character series of this recognized pronunciation. This generated audio signal is outputted from the speaker 32.

In this case, when the speech is recognized by the speech recognition apparatus 10 in this example, longitude and latitude data are supplied to the terminal 20a of the navigation apparatus 20 approximately simultaneously when the data of a character code showing the pronunciation of the recognized speech are supplied to the terminal 20b. The arithmetic circuit 23 first executes processing for synthesizing a word recognized by the speech synthesizer circuit 31 as speech, and next executes processing for making the display data of a road map based on the longitude and latitude data.

Figure 6:
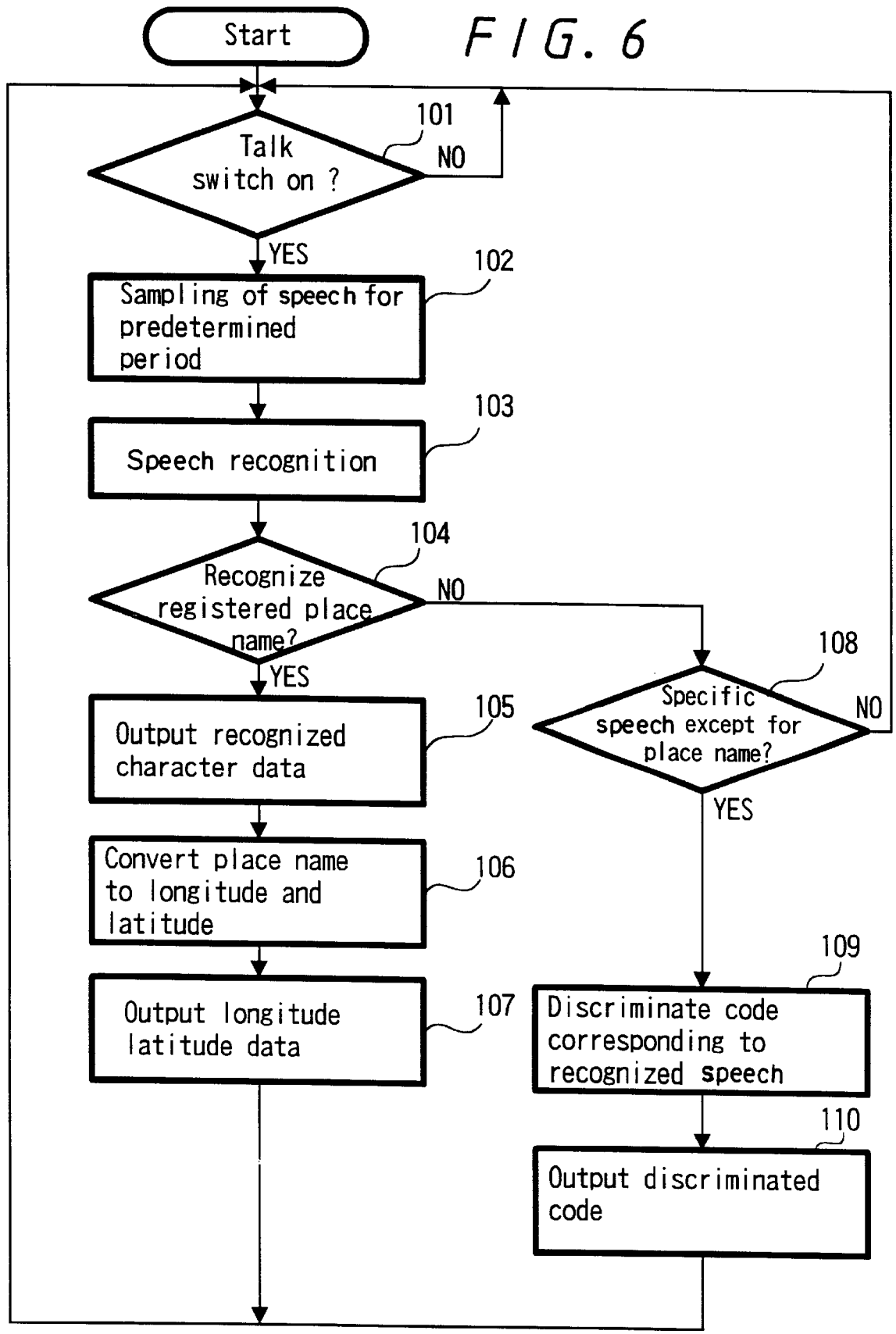
FIG. 6 is a flow chart showing processing by speech recognition in one embodiment.

An operation of the speech recognition apparatus, etc. will next be explained when a road map display, etc. are performed by using the speech recognition apparatus 10 and the navigation apparatus 20 in this example. The flow chart of FIG. 6 shows a speech recognizing operation performed by the speech recognition apparatus 10. In a step 101, it is first judged whether the talk switch 18 is turned on or not. When it is judged that this talk switch 18 is turned on, an audio signal collected by the microphone 11 for a predetermined period from this turning-on operation is sampled by the analog/digital converter 12 and is processed by the digital speech processing circuit 13 and is changed to vector data (step 102). Then, the speech recognition circuit 14 performs speech recognizing processing based on these vector data (step 103).

Here, it is judged in a step 104 whether the speech of a place name (namely, a place name registered in advance) stored to the ROM 15 for storing speech recognition data is recognized or not. When the speech of the registered place name is recognized, character data for pronouncing the recognized place name are read from the ROM 15 and are outputted from the output terminal 10b (step 105). Further, longitude and latitude data of the recognized place name are read from the ROM 17 for storing longitude and latitude converting data connected to the longitude latitude converting circuit 16 (step 106). Here, in the speech recognition of the place name, place names registered in the ROM 15 in this example are constructed by the names of domestic urban and rural prefectures, cities, wards, towns and villages. Accordingly, for example, a voice of "xx city, xx prefecture" and a voice of "xx ward, xx city" (here, the voice can be set to be recognized even when the names of urban and rural prefectures are omitted in the ward case) are recognized.

The longitude and latitude data read on the basis of the recognized speech and accompanying data thereof are outputted from the output terminal 10a (step 107).

When no speech of the registered place name can be recognized in the step 104, it is judged in a step 108 whether a specific registered speech except for the place name is recognized or not. Here, when the specific registered speech except for the place name is recognized, a character code corresponding to the recognized speech is judged (step 109) and is outputted from the output terminal 10*b* (step 110).

In contrast to this, when no specific registered speech except for the place name can be recognized in the step 108, processing at this time is terminated. Otherwise, disability of the speech recognition is transmitted to the navigation apparatus 20. The navigation apparatus 20 then gives warning by synthesized speech in the speech synthesizer circuit 31 or characters, etc. displayed in the displaying apparatus 40.

Figure 7:
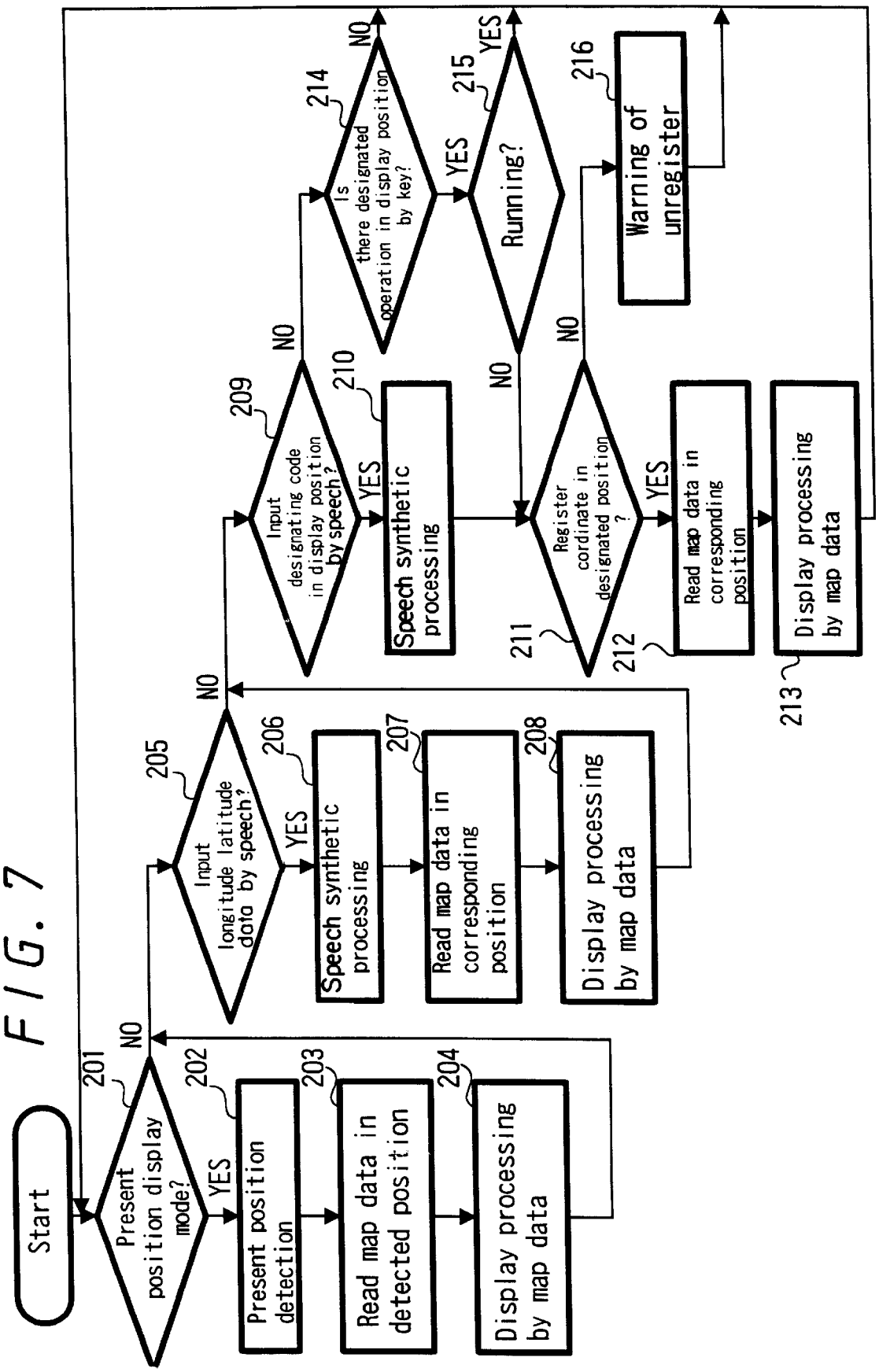
FIG. 7 is a flow chart showing display processing in a navigation apparatus in one embodiment.

Next, the flow chart of FIG. 7 shows the operation of the navigation apparatus 20. It is first judged in the arithmetic circuit 23 in a step 201 whether a display mode in the present position is set or not. When it is judged that the display mode in the present position is set, the present position detecting circuit 22 measures the present position (step 202). Road map data in the vicinity of the measured present position are read from the CD-ROM (step 203). Display processing of a road map based on these read road map data is performed and the road map in a corresponding coordinate position is displayed in the displaying apparatus 40 (step 204).

In contrast to this, when it is judged in the step 201 that no display mode in the present position is set, or, when the display processing of the road map in the present position in the step 204 is terminated and a displaying state of this road map is set, it is judged in a step 205 whether longitude and latitude data, etc. are supplied from the speech recognition apparatus 10 through the input terminals 20*a* and 20*b*. Here, when it is judged that the longitude and latitude data and accompanying character data thereof, etc. are supplied, a character code for a pronunciation supplied through the terminal 20*b* is first supplied to the speech synthesizer circuit 31 and speech recognized by the speech recognition apparatus 10 is synthesized and outputted from the speaker 32 (step 206). Subsequently, road map data in the vicinity of a position shown by the longitude and latitude data are read from the CD-ROM (step 207) and display processing of a road map based on these read road map data is performed. The road map in a corresponding coordinate position is then displayed in the displaying apparatus 40 (step 208).

When it is judged in the step 205 that no longitude and latitude data are supplied from the speech recognition apparatus 10, or when display processing of the road map of a designated place name in the step 208 is terminated and a displaying state of this road map is set, it is judged in a step 209 whether or not a character code for directly designating a display position is supplied from the speech recognition apparatus 10 through the input terminal 20*b*. When it is judged that the character code is supplied from the terminal 20*b*, this character code is supplied to the speech synthesizer circuit 31 and speech recognized by the speech recognition apparatus 10 is outputted from the speaker 32 (step 210). Next, when the character code (namely, words of "destination", "starting spot", "routing spot", "one's own house", etc.) for directly designating the display position is discriminated in the step 209, it is judged in a step 211 whether a coordinate position designated by these characters is registered to the RAM 25 or not. When this coordinate position is registered to the RAM 25, road map data in the vicinity of a position shown by the longitude and latitude data as the registered coordinate position are read from the CD-ROM (step 212). Then, display processing of a road map based on these read road map data is performed and a road map in the corresponding coordinate position is displayed in the displaying apparatus 40 (step 213) and it is returned to the step 201 in this displaying state.

When it is judged in the step 209 that no character code for directly designating the display position is supplied from the speech recognition apparatus 10, it is judged in the arithmetic circuit 23 in a step 214 whether or not there is an operation for designating the display position by operating the operation key 27. When there is an operation for designating this display position, it is judged in a step 215 from detected data of the car speed sensor 26 whether the vehicle is running at the present time or not. When the arithmetic circuit 23 judges that the vehicle is running, the operation at this time is invalidated and it is returned to the step 201 (a certain warning may be given at this time).

When it is judged that no vehicle is running, control goes from step 211. In the step 211, it is judged whether there is a registered coordinate or not. Thereafter, when there is a registered coordinate position, display processing of a road map in this position is performed in the steps 212, 213 and it is then returned to the step 201.

In contrast to this, when no coordinate in a corresponding position such as "destination", "starting spot", "routing spot", "one's own house", etc. is registered in the step 211, an unregister warning is given by a synthesizer speech in the speech synthesizer circuit 31 or display characters in the displaying apparatus 40 in a step 216 and it is then returned to the step 201.

Processing relative to the map display is explained with reference to the flow chart of FIG. 7. However, when a character code is supplied from the speech recognition apparatus 10 as a result of the recognition of speech for designating an operation except for the map display, corresponding processing is performed on the basis of control of the arithmetic circuit 23. For example, when "what time now", etc. are recognized and a character code is supplied, speech for pronouncing the present time is synthesized by the speech synthesizer circuit 31 on the basis of the control of the arithmetic circuit 23 and is outputted from the speaker 32. The other commands are also processed such that a responsive speech is synthesized by the speech synthesizer circuit 31 and is outputted from the speaker 32, or a corresponding display is performed by the displaying apparatus 40.

Since the above processing is performed, the display position can be freely set by a speech input in any place in the whole country and a road map in a desirable position can be simply displayed. Namely, the speech of an operator is simply recognized when the operator speaks "xx city, xx prefecture" and "xx ward, xx city" toward the microphone 11 while the operator pushes the talk switch 18. A road map in this region is also displayed. Accordingly, it is not necessary to designate a position by a key operation, etc. For example, the navigation apparatus can be operated even in a situation in which it is difficult to perform the key operation. In this case, the speech spoken place name recognized by the speech recognition apparatus 10 in this example is limited to the names of domestic urban and rural prefectures, cities, wards, towns and villages so that the number of recognized speech is limited to a relatively small number (about 3500). Accordingly, the place name can be recognized by speech recognition processing in a short time by a relatively small processing amount by the speech recognition circuit 14 within the speech recognition apparatus 10. Therefore, it is possible to shorten a time until a map designated in an inputted speech is displayed. Further, a recognition rate itself is also improved since the number of recognized place names is limited.

Figure 8A:
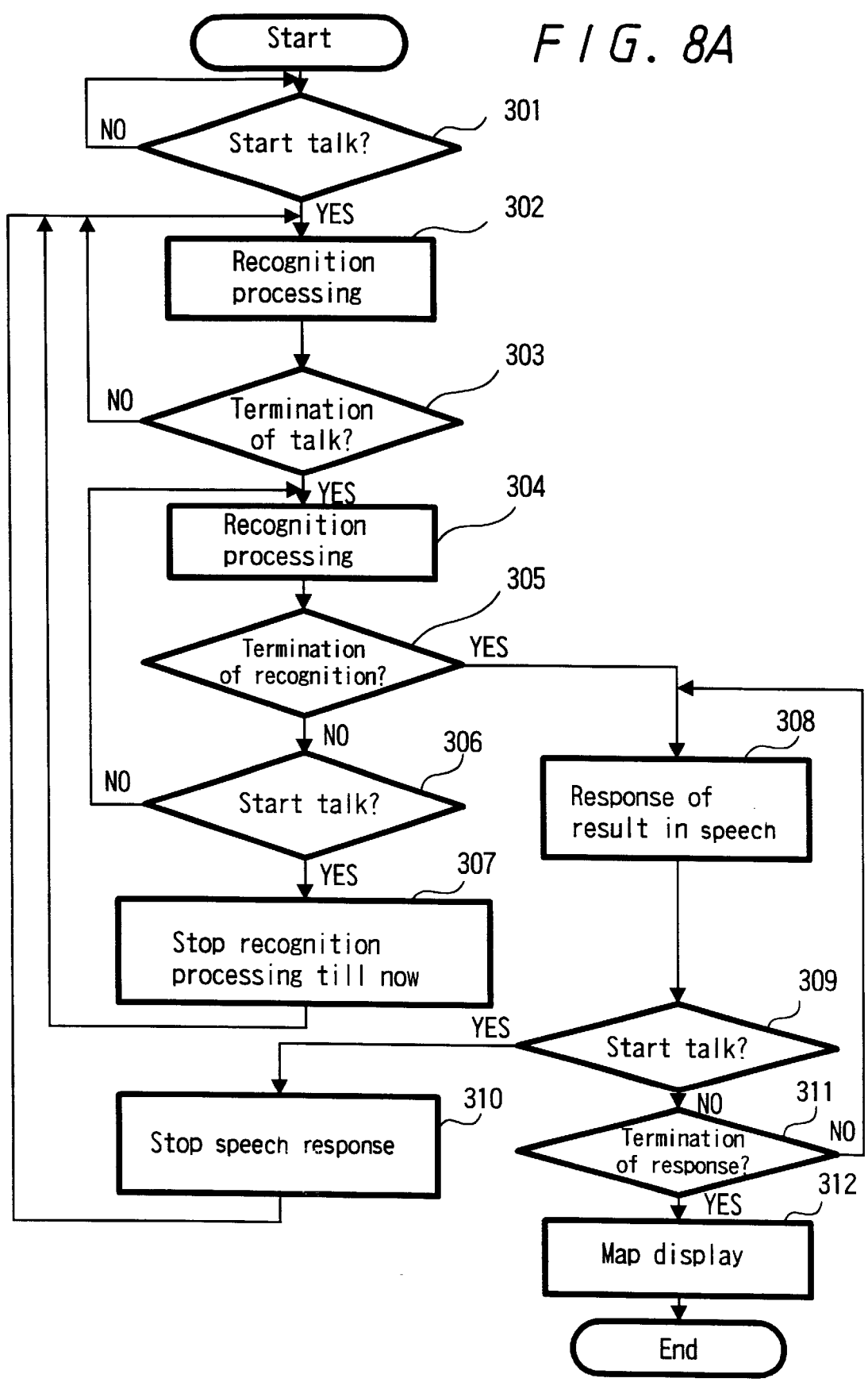
FIG. 8A is a flow chart showing processing from a speech input to a map display in one embodiment.

Here, the flow chart of FIG. 8A shows a processing operation relative to a map display based on the speech recognition among the operations of the speech recognition apparatus 10 and the navigation apparatus 20 explained above. This flow chart mainly shows processing when speech is repeated.

First, it is judged in a step 301 whether a talk is begun, e.g., the talk switch 18 is turned on or not. When it is judged that speech has begun, speech recognition processing of an inputted audio signal is started in a step 302. Then, it is judged in a step 303 whether the speech has ended, i.e., the talk switch 18 is turned off or not. When it is judged that speech has ended, the speech recognition processing is performed with respect to all audio signals inputted at that time point in a step 304. Then, it is judged in a step 305 whether the recognition processing is terminated or not.

Here, when it is judged that no recognition processing has terminated (i.e., while the recognition processing is continuously performed), control goes from a step 306 and it is judged whether the talk has started (namely, whether the talk switch 18 is pushed) or not. When it is not judged that the talk has started, it is returned to the step 304 and the recognition processing is continuously performed. In contrast to this, when it is judged in the step 306 that the talk has started, the recognition processing till now is stopped in a step 307. Then, it is returned to the step 302 and the recognition processing is started by an audio signal newly inputted.

When it is judged in the step 305 that the recognition processing has terminated, control goes from a step 308 and output processing of the recognized speech from the speaker 32 by speech synthesis in the speech synthesizer circuit 31 is performed. Here, while this speech is outputted from the speaker 32, it is judged in a step 309 whether the talk has started (namely, whether the talk switch 18 is pushed) or not. At this time, when it is judged that the talk has started, control data for interrupting the speech synthesizer processing in the speech synthesizer circuit 31 are transmitted from the speech recognition circuit 14 within the speech recognition apparatus 10 to the arithmetic circuit 23 within the navigation apparatus 20 so that the speech synthesis processing in the speech synthesizer circuit 31 is stopped. Then, it is returned to the step 302 and the recognition processing is started by an audio signal newly inputted.

When it is not judged in the step 309 that the talk has started, it is judged in a step 311 that the output of the recognized speech by the speech synthesis in the speech synthesizer circuit 31 is terminated. Thereafter, a map display in a corresponding position is executed in the displaying apparatus 40 in a step 312 and processing of the map display by the speech recognition is terminated.

Since the above display processing is performed, the display position can be freely set by speech input in any place in the whole country and a road map in a desirable position can be simply displayed. Namely, the speech of an operator is simply recognized when the operator speaks "xx city, xx prefecture" and "xx ward, xx city" toward the microphone 11 while the operator pushes the talk switch 18. A road map in this region is also displayed. Accordingly, it is not necessary to designate a position by a key operation, etc. For example, the navigation apparatus can be operated even in a situation in which it is difficult to perform the key operation. In this case, the speech spoken place name recognized by the speech recognition apparatus 10 in this example is limited to the names of domestic urban and rural prefectures, cities, wards, towns and villages so that the number of recognized speech is limited to a relatively small number (about 3500). Accordingly, the place name can be recognized by the speech recognition processing in a short time by a relatively small processing amount by the voice recognition circuit 14 within the speech recognition apparatus 10. Therefore, it is possible to shorten a time until a map designated in an inputted speech is displayed. Further, a recognition rate itself is also improved since the number of recognized place names is limited.

In the case of this example, a series of characters of recognized speech is outputted as speech by the speech synthesis in the speech synthesizer circuit 31 of the navigation apparatus 20. Accordingly, the operator can judge by hearing the output speech whether the inputted speech is correctly recognized or not. The operator can also immediately judge without actually seeing a displayed map whether the displayed map of a map in a correct region or not. Accordingly, it is possible to prevent an error in operation caused by an erroneous speech input, namely, an error in operation in which a map in a region different from a place designated in the speech is displayed.

In the case of this example, while speech is processed within the speech recognition apparatus 10 after a region, etc. are designated by this speech, there is a case in which the talk switch 18 is again pushed to designate a region, etc. by a new speech. In this case, the processing within the speech recognition apparatus 10 is stopped and the recognition processing is executed on the newly inputted speech. Accordingly, it is a convenient process when there is an input error, etc. For example, when speech is inputted and there is an error in the names of urban and rural prefectures, cities, wards, towns and villages, this error can be corrected by again pushing the talk switch 18 and repeating the speech. Accordingly, the erroneous input can be very simply corrected in comparison with an operating case in which the key 27 for designating various kinds of operations is operated to designate the input error. In particular, the speech input error can be simply corrected even in a situation in which it is difficult to perform a complicated key operation such as a situation during driving of a car. Therefore, it is suitable for a navigation apparatus as in this example.

In this case, as shown in the flow chart of FIG. 8A, reprocessing using a reinput of this speech is valid while the recognized speech is outputted. Accordingly, for example, when a speech outputted from the speaker 32 is different from the intended speech of a driver (namely, when an error in recognition is caused in the speech recognition circuit 14), the recognition processing can be executed again by repeating speech of the same region name. Therefore, it is possible to cope with a recognized speech error by a simple operation.

In the flow chart of FIG. 8A, a reinput is received while the recognized speech is outputted from the speaker 32 by speech synthesis in the speech synthesizer circuit 31. However, while map data are read and a road map is displayed in the displaying apparatus 40 after the output of this speech, the map display may be interrupted when talk is started and the recognition processing may be started for the newly inputted speech.

In the case of this example, data of a coordinate position corresponding to a place name stored to the ROM 17 within the speech recognition apparatus 10 are set to latitude and longitude data showing an absolute position in the seat of a government office (a city office, a ward office, a town office, a village office) in its region. Accordingly, a map with the government office as a center in its region is displayed so that a preferable display state is set. Namely, the government office in each region is located in a central portion of this region relatively in many cases. Accordingly, the possibility of a most preferable display form is high.

In this case, the scale (reduced scale) of a display map is set to a display scale shown by accompanying data stored to the ROM 17. Accordingly, for example, it is possible to provide a display form for approximately displaying all of a region designated in a speech at this time so that a preferable display can be provided. This display scale may be set to a predetermined scale fixed at any time. For example, varying and fixing settings of this display scale may be switched by setting a mode.

In the case of this example, a speech ("destination", "starting spot", "routing spot", "one's own house", etc.) for specifying a place except for a place name can be also recognized by the speech recognition apparatus 10. Accordingly, a display position can be directly set to a registered position by performing this designation through the speech. In this case, it is not necessary to judge coordinate data within the speech recognition apparatus 10 so that processing of the speech recognition apparatus 10 can be correspondingly performed rapidly.

In the case of this example, when the names of cities, wards, towns and villages are recognized as voices by the voice recognition apparatus 10, it is recognized as the same place name in both the pronouncing cases of "machi" and "son" and the pronouncing cases of "cho" and "mural with respect to "town" and village". Accordingly, the place name itself can be correctly recognized even when the pronunciations of "town" and "village" are incorrect, thereby improving the recognition rate correspondingly. Further, the names of cities, wards, towns and villages tending to be mistaken with respect to the names of urban and rural prefectures can be also recognized correctly even when these names of the urban and rural prefectures are mistaken, thereby further improving the recognition rate.

Further, in this example, when speech is inputted and its recognition processing is performed and the speech is then inputted again, past recognized results are referred at a recognition processing time of this reinputted speech. Hereafter, this processing is shown in the flow chart of FIG. 8B.

First, when a sufficient time (e.g., several minutes) has passed from a previous speech recognition processing, a temporary list of recognized speech within the speech recognition circuit 14 is cleared in a step 301. Thereafter, it is judged in a step 302 whether speech has started, i.e., the talk switch 18 is turned on or not. When it is judged that the speech has started, it is further judged in a step 303 whether a predetermined time Th (here, 10 seconds) has passed from a previous talk or not. When the predetermined time has passed, the temporary list of recognized speech within the speech recognition circuit 14 is cleared in a step 304. In contrast to this, when no predetermined time Th has passed from the previous talk, no temporary list of recognized speech.

The recognition processing of an inputted speech is next performed on the basis of control of the speech recognition circuit 14 in a step 305. Speech data of a candidate obtained by this recognized result is collated with speech data in the temporary list of recognized speech. When there are the same data in the temporary list of recognizes speech, these data are deleted from the recognized candidate in a step 306. Data having a highest recognition degree (conformity degree) among the remaining candidate data at this time are supplied to the speech synthesizer circuit 31 of the navigation apparatus 20 as a recognized result and are outputted as speech from the speaker 32 in a step 307. When this recognized result is a speech indicating a region (i.e., the names of urban and rural prefectures, cities, wards, towns and villages in the case of this example), a map for displaying these cities, wards, towns and villages is displayed in the displaying apparatus 40 by processing within the navigation apparatus 20 in a step 308. At this time, the recognized result is added to the temporary list of recognized speech in a step 309 and it is returned to the step 302 and waits for the next talking to start.

In such control, when the talk is continuously carried out within a constant time (e.g., within 10 seconds), it is considered as a repeated talk so that a first candidate of the previous recognized result is removed from recognized object words. Accordingly, an incorrect place name is again recognized by carrying out the retalk so that an unrecognizing situation of a desirable place name can be prevented. For example, "Kanagawa ward, Yokohama city" and "Kanazawa ward, Yokohama city" exist as similar place names. When a person inputting a voice talks "Kanagawa ward, Yokohama city", it is assumed that "Kanazawa ward, Yokohama city" is incorrectly recognized. At this time, when no countermeasures are taken by repeating the same pronunciation, there is a high possibility that "Kanazawa ward, Yokohama city" is again recognized incorrectly. However, here, there is already the pronunciation of "Kanazawa ward, Yokohama city" in the temporary list of recognized speech at a second speech inputting time. Accordingly, this "Kanazawa ward, Yokohama city" is removed from the recognized object words. When there is "Kanagawa ward, Yokohama city" as a second candidate, this "Kanagawa ward, Yokohama city" is moved up as the first candidate. Thus, it is judged that "Kanagawa ward, Yokohama city" is recognized. As a result, when the repeated talk is carried out, the error in recognition is prevented so that recognition rate can be correspondingly improved.

Here, it is limited to the case of the repeated talk within a constant time of about 10 seconds. Accordingly, the recognition can be performed except that the repeated talk is immediately carried out with respect to a word once removed from the recognized object words. Therefore, no recognition rate is reduced from this point.

In this example, when such a repeated talk is repeated, it is judged that it is difficult to exactly perform the recognition by only speech input. Then, data of the candidate list at this time are supplied to the navigation apparatus 20. A video signal for displaying candidates having a recognizing possibility within the navigation apparatus 20 as a list is made and this list is displayed in the displaying apparatus 40.

Figure 9:
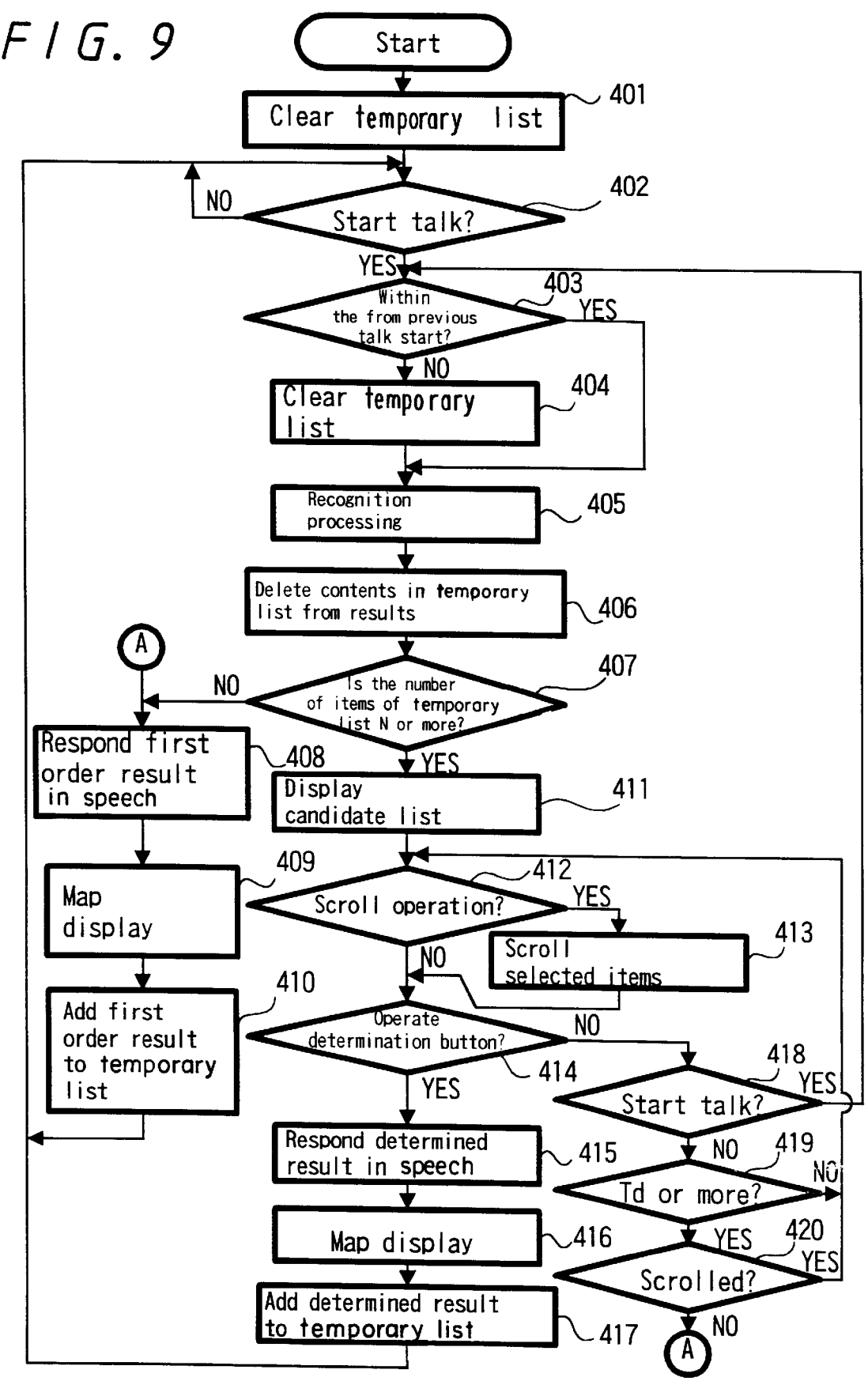
FIG. 9 is a flow chart showing processing when the speech recognition in one embodiment is executed plural times.

The flow chart of FIG. 9 shows processing in this case. First, when a sufficient time (e.g., several minutes) has passed from previous speech recognition processing, the temporary list of recognized speech within the speech recognition circuit 14 is cleared in a step 401. Thereafter, it is judged in a step 402 whether a talk has started, namely, the talk switch 18 is turned on or not. When it is judged that the talk has started, it is further judged in a step 403 whether a predetermined time Th (here, 10 seconds) has passed from a previous talk or not. When the predetermined time has passed, the temporary list of recognized voice within the speech recognition circuit 14 is cleared in a step 404. In contrast to this, when no predetermined time Th has passed from the previous talk, no temporary list of recognized speech is cleared.

The recognition processing of an inputted speech is next performed on the basis of control of the speech recognition circuit 14 in a step 405. Speech data of a candidate obtained by this recognized result is collated with speech data in the temporary list of recognized speech. When there are the same data in the temporary list of recognized speech, these data are deleted from the recognized candidate in a step 406. Next, it is judged in a step 407 whether or not the number of items of the temporary list of recognized speech is equal to or greater than N (here, 5). When the number of items is not equal to or greater than N (i.e., when no talk is continuously carried out N times), control goes from a step 408. Then, data having a highest recognition degree (conformity degree) among the remaining candidate data at this time are supplied to the speech synthesizer circuit 31 of the navigation apparatus 20 as a recognized result and are outputted as speech from the speaker 32. When the recognized result is speech showing a region (namely, the names of urban and rural prefectures, cities, wards, towns and villages in the case of this example), a map for displaying these cities, wards, towns and villages is displayed in the displaying apparatus 40 by processing within the navigation apparatus 20 in a step 409. Then, the recognized result at this time is added to the temporary list of recognized speech in a step 410 and it is returned to the step 402 and waits for the next talk to start.

When it is judged in the step 407 that the number of items of the temporary list of recognized speech is N (i.e., when the talk is continuously carried out N times), control goes from a step 411 and display processing of the candidate list is performed. Namely, candidate data recognized in the recognition processing up to now are read from a memory for the candidate list within the speech recognition circuit 14 and are supplied to the navigation apparatus 20. Then, a video signal of the candidate list is generated by the video signal generating circuit 28 within the navigation apparatus 20. This video signal is supplied to the displaying apparatus 40 so that the candidate list is displayed in the displaying apparatus 40.

Figure 10:
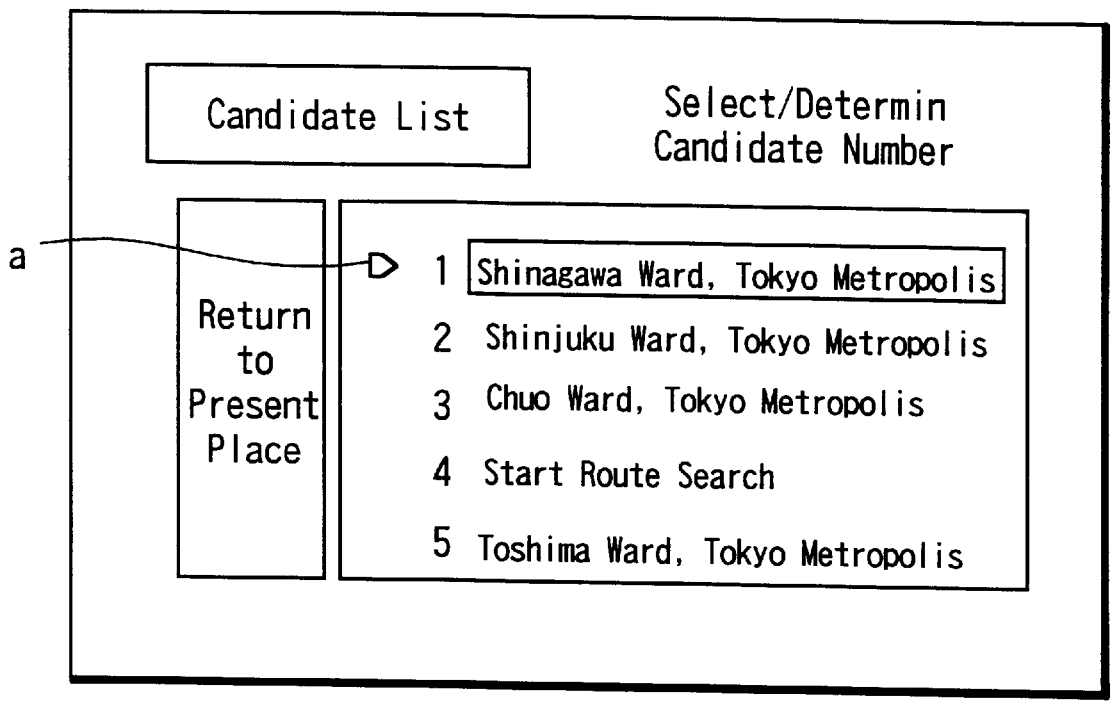
FIG. 10 is an explanatory view showing a display example of a candidate list in one embodiment.

For example, the candidate list at this time is displayed as shown in FIG. 10. Namely, candidates such as about first to fifth candidates are displayed in the order of a highest conformity degree (lower candidates may be also displayed by a scroll operation, etc.). At this time, candidates for place names and commands are set to be displayed in different forms (e.g., display colors of characters are changed). In the example of FIG. 10, these candidates are displayed in different character forms.

A mark a showing a selection is given to the first candidate among the candidates within this candidate list at a first display stage of this candidate list. This mark a showing the selected candidate can be moved by the scroll operation performed by the operation key 27. Next, it is judged in a step 412 whether this scroll operation is performed or not. Here, when the scroll operation is performed, a position of the mark a given to the selected candidate is moved in a step 413.

In this state, it is judged in a step 414 whether a button for determination within the operation key 27 is pushed or not. When it is judged that this button for determination is pushed, it judged that the candidate shown by the mark a is selected. Then, reading of data (longitude and latitude data, character data for a speech output, etc.) relative to this candidate is commanded by the speech recognition apparatus 10. These read data are supplied to the navigation apparatus 20. The speech synthesis processing is performed on the basis of these supplied data in the speech synthesizer circuit 31 so that a place name is outputted as speech from the speaker 32 in a step 415. Then, a video signal for displaying a road map in a corresponding position is made on the basis of the supplied longitude and latitude data and the map of the selected candidate is displayed in the displaying apparatus 40 in a step 416. The selected result at this time is added to the hysteresis list in a step 417 and it is returned to the step 402 and waits for the next talk start.

When it is judged in the step 414 that no button for determination is pushed, it is further judged in a step 418 whether talk has started after that, namely, the talk switch 18 is turned on or not. When it is judged that talk has started, the display of the candidate list is stopped and it is returned to the processing in the step 403. In contrast to this, when it is judged in the step 418 that no talk has started, it is further judged in a step 419 whether or not a predetermined time Td (e.g., about 10 seconds) has passed from starting of the display of the candidate list in the step 411. When this time Td has not passed, it is returned to the processing in the step 412 and a display state of the candidate list is continued. In contrast to this, when it is judged in the step 419 that the predetermined time Td has passed, it is further judged in a step 420 whether the scroll operation is performed in the step 412 or not. When the scroll operation is performed, it is returned to the processing in the step 412 and the display state of the candidate list is continued.

In contrast to this, when it is judged in the step 420 that no scroll operation is performed, control goes from the step 408 and a first order result of the candidate list is outputted as a speech and a map of this first order place name is displayed.

Thus, when the speech input is repeated predetermined times (here, 5 times) for a short time, recognized object words recognized by a continuous input audio signal at this time are displayed as a list in a high recognition degree order. Accordingly, a recognizing state at this time can be easily judged and a word can be selected from the displayed list. Therefore, it is possible to easily cope with a difficult case of the recognition using the speech input by means of a simple operation.

Figure 8B:
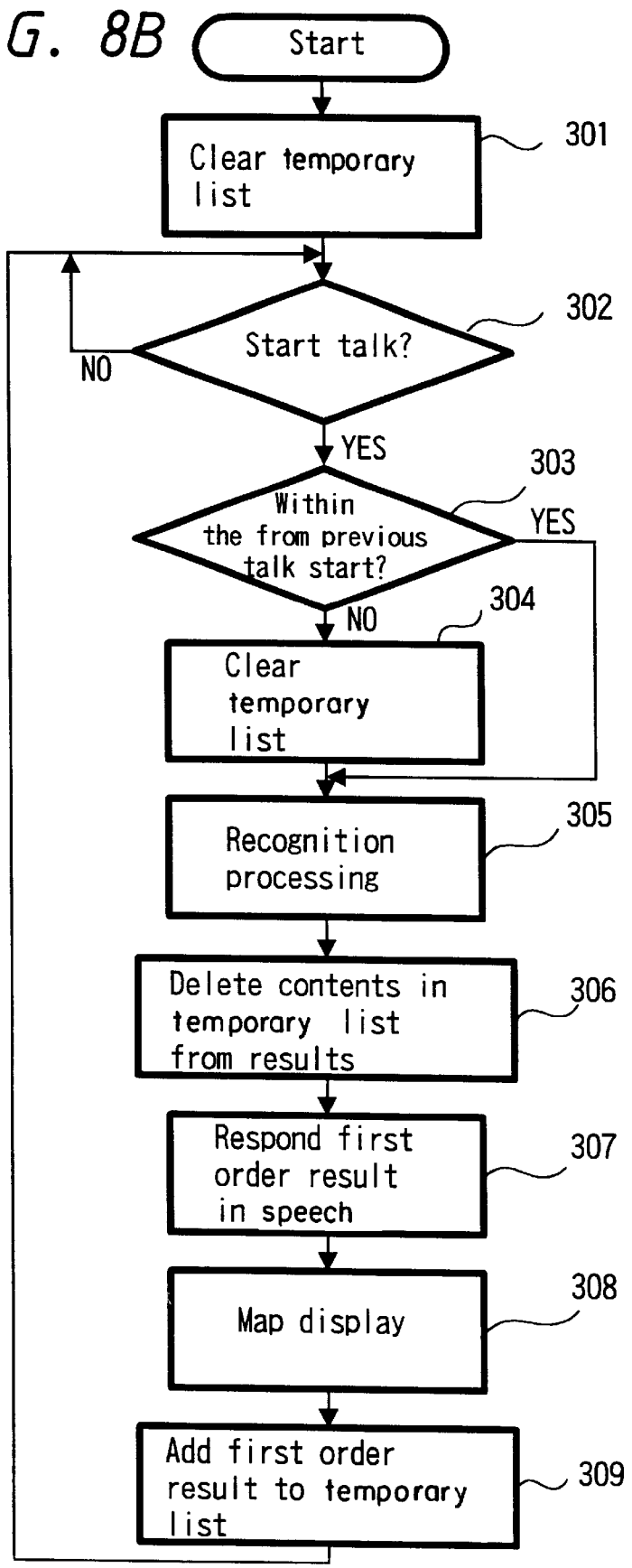
FIG. 8B is a flow chart showing processing at a reexecuting time of speech recognition in one embodiment.

In the explanation of the flow charts of FIGS. 8B and 9, the selected candidate is a place name and a map is displayed on the basis of this place name. However, when the selected candidate is certain commands, corresponding commands are executed instead of the map display.

Figure 11:
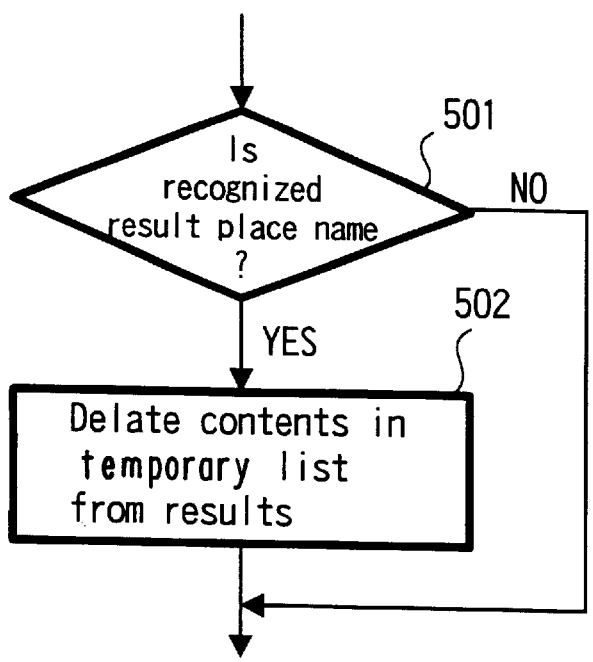
FIG. 11 is a flow chart showing a processing example at a deleting time of a list of recognized speech in one embodiment.

In the above processings in the step 306 shown in FIG. 8B and the step 406 shown in FIG. 9, contents are simply deleted from the candidate list from the recognized result. However, in the case of certain commands, its word may not be removed from the candidate list. Namely, processings in steps 501 and 502 shown in FIG. 11 may be performed instead of steps 306 and 406. Namely, it is judged in a step 501 whether the recognized result is a place name or not. In the step 502, contents in the hysteresis list are deleted from candidates of the recognized result only when it is judged as a place name in the step 501. When the recognized result is commands, etc. except for the place name, control goes from the next step without the deletion in the step 502. Thus, in the case of a speech for giving any commands, this speech is repeatedly recognized every time this speech is inputted, thereby executing a corresponding operation. For example, "what time now" is recognized in a speech and this result is outputted as "It is xx o'clock, xx minute" in a speech. In this case, when the speech about this time is missed in hearing, there is a case in which "what time now" is continuously recognized again in a speech. In this case, this result is also outputted again as "It is xx o'clock, xx minute" in a speech so that corresponding control is preferably performed.

When the candidate list is displayed as a table as shown in FIG. 10, recognized object words shown in this list may be sequentially outputted as speech from the speaker 32 by the speech synthesizer processing in the speech synthesizer circuit 31. Thus, candidates for the recognized object words are known without seeing the display of the displaying apparatus 40 so that handling of the navigation apparatus is improved.

In the above embodiment, place names recognized by the speech recognition apparatus are limited to the names of domestic urban and rural prefectures, cities, wards, towns and villages. However, more detailed place names, the names of target objects, etc. may be also recognized. In this case, when the number of recognizable place names, etc. is increased, a processing amount and a processing time required for the speech recognition are correspondingly increased. Therefore, it is most preferable to limit the number of recognizable place names to about the number of names of cities, wards, towns and villages so as to improve a recognition rate.

In the above embodiment, a central coordinate every place name is set to latitude and longitude data showing an absolute position in the seat of a government office (a city office, a ward office, a town office, a village office) in its region, but may be set to latitude and longitude data showing another position. For example, the central coordinate may be simply set to latitude and longitude data of a center of its region (a city, a ward, a town, a village).

Further, data in the coordinate positions of end portions of east, west, south and north in its region may be stored instead of such central latitude and longitude data. In this case, it is sufficient if there are four data of east and west longitudes and south and north latitudes.

In the above embodiment, a recognized speech is converted to a character code by the speech recognition circuit 14 within the speech recognition apparatus, and this character code is converted to longitude and latitude data by the longitude latitude converting circuit 16. However, the recognized speech may be directly converted to longitude and latitude data. When no recognized speech is directly converted to the longitude and latitude data, the ROM 15 and the ROM 17 for storing these converted data may be constructed by the same memory such that, for example, the memory area of a place name is commonly used.

In the above embodiment, the present invention is applied to a navigation apparatus using a position measuring system called a GPS. However, the present invention can be also applied to a navigation apparatus using another position measuring system.

In accordance with the speech recognition apparatus of the present invention, when a new audio signal is inputted during the execution of processing of an inputted audio signal, the executed processing is interrupted and the processing of the newly inputted audio signal is executed. Accordingly, for example, when a specific region is designated in a speech and a place name, etc. are incorrectly inputted, processings subsequent to the recognition processing by a correct speech are executed only by respeaking a correct place name. Therefore, it is possible to simply cope with an input error, etc. without performing a complicated key operation for canceling the input, etc.

Further, in this speech recognition apparatus, when another speech is again inputted during the output of a recognized speech, output processing of the speech is interrupted and discriminating processing of the reinputted speech is performed. Accordingly, it is possible to simply cope with a case in which an error in recognition is known by the output of the recognized speech, by means of only the speech reinput.

When the recognized speech is not correctly recognized when first spoken, but is respoken, a recognized object word first recognized in error is removed from the candidates for recognized object words recognizable in a speech processing section. Accordingly, correct recognition possibility is increased so that recognition rate can be substantially improved.

In this case, when recognized object words showing a specific region and a predetermined command are prepared as a recognized speech and the recognized object word of a previously recognized speech is a speech showing the predetermined command, this recognized object word is not removed from the recognized object words able to be recognized as speech. Accordingly, the removing processing from candidates is performed only in the case of a speech showing a region. Therefore, it is possible to prevent an error in operation when the same command is repeatedly inputted as speech.

When the speech is repeatedly inputted a predetermined number of times, recognized object words recognized by a continuous input audio signal at this time are displayed as a list in a high recognition degree order and are selected from this display. Accordingly, it is possible to simply cope with the case of a repetitious error in recognition.

In accordance with the speech recognition method of the present invention, when a new audio signal is inputted during the execution of processing of an inputted audio signal, the executed processing is interrupted and the processing of the newly inputted audio signal is executed. Accordingly, for example, when a specific region is designated in speech and a place name, etc. are incorrectly inputted, processings subsequent to the recognition processing by a correct speech are executed only by respeaking a correct place name. Therefore, it is possible to simply cope with an input error time, etc. without performing a complicated key operation for canceling the input, etc.

In this speech recognition method, when another speech is again inputted during the output of a recognized speech, output processing of the speech is interrupted and discriminating processing of the reinputted speech is performed. Accordingly, it is possible to simply cope with a case in which an error in recognition is known by the output of the recognized speech, by means of only the speech reinput.

Further, in accordance with the speech recognition method of the present invention, when the recognized speech is not correctly recognized when first spoken, but is respoken, a recognized object word first recognized in error is removed from the candidates for recognized object words able to be recognized. Accordingly, correct recognition possibility is increased.

In accordance with the navigation apparatus of the present invention, when a new audio signal is inputted during the execution of processing for a map display by an inputted audio signal, the executed processing is interrupted and the map display processing is executed by the newly inputted audio signal. Accordingly, for example, when a specific region is designated in a speech and a place name, etc. are incorrectly inputted, a region name by a correct speech is recognized only by respeaking a correct place name, and a map in a correct position is displayed. Therefore, it is possible to simply cope with a case in which a speech is inputted in error, by means of speech.

In this navigation apparatus, when another speech is again inputted during the output of a recognized speech, output processing of the speech is interrupted and discriminating processing of the reinputted speech is performed. Accordingly, it is possible to simply cope with a case in which an error in recognition is known by the output of the recognized speech, by means of only the speech reinput.

Further, in accordance with the navigation apparatus of the present invention, when the recognized speech is not correctly recognized when first spoken, but is respoken, a recognized object word first recognized in error is removed from the candidates for recognized object words able to be recognized. Accordingly, the possibility of an operation of the navigation apparatus such as a correct map display, etc. by correct recognition is increased.

In this case, when recognized object words showing a specific region and a predetermined command are prepared as a recognized speech and the recognized object word of a previously recognized speech is a speech showing the predetermined command, this recognized object word is not removed from the recognized object words able to be recognized as speech. Accordingly, the removing processing from candidates is performed only in the case of a speech showing a region. Therefore, it is possible to prevent an error in operation of the navigation apparatus when the same command is repeatedly inputted as speech.

When the speech is repeatedly inputted a predetermined number of times, recognized object words recognized by a continuous input audio signal at this time are displayed as a list in a high recognition degree order so that a recognizing state at that time can be easily judged.

The recognized object words displayed as a list are sequentially outputted as speech from the above speech output section. Accordingly, the recognized object words are known in speech without seeing a displaying state.

Further, a selection can be made from the recognized object words displayed as a list on the basis of the operation of a predetermined operating means. Accordingly, when there is a repetitious error in recognition, a required recognized object word can be simply searched and a map display by this word, etc. can be performed.

When no operation of the predetermined operating means is performed within a predetermined time in a state displayed as a list, the recognized object word of a candidate having a highest recognition possibility is automatically selected from the recognized object words displayed as a list. Accordingly, the list display is switched to the map display in a suitable form.

Further, when an audio signal is inputted to an audio signal input means during the list display, the speech recognition processing of this inputted audio signal is performed in a speech processing section. Accordingly, it is possible to cope with a case in which a speech is again inputted by confirming the list display. Therefore, an operation using the speech input can be preferably performed.

Further, in accordance with the navigation method of the present invention, when a new audio signal is inputted during the execution of processing for a map display by an inputted audio signal, the executed processing is interrupted and the map display processing is executed by the newly inputted audio signal. Accordingly, for example, when a specific region is designated in a speech and a place name, etc. are incorrectly inputted, a region name by a correct speech is recognized only by respeaking a correct place name, and a map in a correct position is displayed.

Therefore, it is possible to simply cope with a case in which a speech is inputted in error, by means of speech.

Further, in this navigation method, when another speech is again inputted during the output of a recognized speech, output processing of the speech is interrupted and discriminating processing of the reinputted speech is performed. Accordingly, it is possible to simply cope with a case in which an error in recognition is known by the output of the recognized speech, by means of only the speech reinput.

Further, in accordance with the navigation method of the present invention, when the recognized voice is not correctly recognized when first spoken, but is respoken, a recognized object word first recognized in error is removed from the candidates for recognized object words able to be recognized. Accordingly, the possibility of a navigating operation such as a correct map display, etc. by correct recognition is increased.

Further, in accordance with the car of the present invention, when a new audio signal is inputted during the execution of processing for a map display using a display means within the car by an inputted audio signal, the executed processing is interrupted and the map display processing is executed by the newly inputted audio signal. Accordingly, for example, when a specific region is designated in a speech and a place name, etc. are incorrectly inputted, a region name by a correct speech is recognized only by respeaking a correct place name, and a map in a correct position is displayed in the display means within the car. Therefore, it is possible to simply cope with a case in which a speech is inputted in error, without obstructing driving of the car, etc.

Further, in accordance with the car of the present invention, when a map is displayed on the basis of the recognition of an inputted voice and the recognized voice is not correctly recognized when first spoken, but is respoken, a recognized object word first recognized in error is removed from the candidates for recognized object words able to be recognized. Accordingly, the possibility of a correct map display by correct recognition is increased.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A speech recognition apparatus for use with a display device, the apparatus comprising:

sound signal input means for entering a sound signal and including a talk switch;

speech recognition means for recognizing first words including a name and a word for designating an operation of the apparatus in a first speech forming said entered sound signal and for converting data thereof into character code data, said speech recognition means including a temporary memory for temporarily storing results obtained in converting the first speech into the character code data;

control means included in said speech recognition means and connected to said talk switch for controlling operation of said speech recognition means, wherein when said talk switch is actuated for a predetermined period of time while said speech recognition means is recognizing the first words in said first speech, said control means cancels said recognizing operation of said speech recognition means and erases contents of said temporary memory, thereby permitting entering of a second speech forming said entered sound signal including second words different than said first words through said sound signal input means for recognition by said speech recognition means, wherein when the speech recognition means does not recognize the first words characters are displayed by the display device.

2. A speech recognition apparatus for use with a display device, the apparatus comprising:

sound signal input means for entering a sound signal and including a talk switch;

speech recognition means for recognizing first words including a name and a word for designating an operation of the apparatus in a first speech forming said entered sound signal and for converting data thereof into character code data, said speech recognition means including a temporary memory for temporarily storing results obtained in converting the first speech into the character code data;

sound generating means for generating sound; and control means included in said speech recognition means and connected to said talk switch for controlling operation of said speech recognition means and said sound generating means, wherein when said talk switch is actuated for a predetermined period of time while said sound generating means is generating sound corresponding to the first speech, said control means cancels said sound generating operation and erases contents of said temporary memory, thereby permitting entering of a second speech forming said entered sound signal and including second words different than said first words through said sound signal input means for recognition by said speech recognition means and causing said sound generating means to generate sound corresponding to the second speech, wherein when the speech recognition means does not recognize the first words characters are displayed by the display device.

3. A speech recognition apparatus comprising:

sound signal input means for entering a sound signal and including a talk switch;

speech recognition means for recognizing words including a name and a word for designating an operation of the apparatus in said entered sound signal and for converting data thereof into character code data, said speech recognition means including a temporary memory for temporarily storing results obtained in converting the entered sound signal;

display means for providing a visual display; and control means included in said speech recognition means and connected to said talk switch for controlling operation of said speech recognition means, wherein when said control means finds that said sound signal is re-entered a predetermined number of times corresponding to respective actuations of said talk switch and the name is not recognized, said control means controls said display means to display a candidate list of names from which a desired name is selected by a user of the apparatus.

4. A speech recognition apparatus as claimed in claim 3, further comprising sound generating means for generating sound, wherein said control means controls said sound generating means to generate a sound to alert the user of said list of words to be selected.

5. A speech recognition method for use in a display system, the method comprising:

a sound signal input step for entering a sound signal upon actuating a talk switch;

a speech recognition step for recognizing first words including a name and a word for designating an operation of an apparatus in a first speech forming said entered sound signal and for converting data thereof into character code data, and including temporarily storing in a memory results obtained in the step of converting the first speech into the character code data; and a control step performed as part of said speech recognition step for controlling said speech recognition step, wherein when said sound signal is entered upon actuating the talk switch for a predetermined period of time while a recognizing step is being executed in said speech recognition step, said control step cancels said recognizing or converting operation in said speech recognition step and including the steps of erasing contents of the memory, performing again said sound signal input step including entering a second speech forming said entered sound signal having second words different than said first words, and displaying data on the display system when the first words are not recognized in the speech recognition step.

6. A speech recognition method for use in a display system, the method comprising:

a sound signal input step for entering a sound signal upon actuating a talk switch;

a speech recognition step for recognizing words including a name and a word for designating an operation of an apparatus in said entered sound signal and for converting data thereof into character code data, and temporarily storing in a memory results obtained in the step of converting the sound signal the into the character code data;

a sound generating step for generating sound; and;

a control step performed as part of said speech recognition step for controlling said speech recognition step and said sound generating step, wherein when said sound signal is entered upon actuating the talk switch for a predetermined period of time while a sound is being generated in said sound generating step, said control step includes the steps of canceling said sound generating operations, erasing contents of the memory, and performing again said sound signal input step.

7. A speech recognition method for use with a display system, the method comprising:

a sound signal input step for entering a sound signal upon actuating a talk switch;

a speech recognition step for recognizing words including a name and a word designating an operation of an apparatus in said entered sound signal and for converting data thereof into character code data, and including temporarily storing in a memory results obtained in the step of converting the entered sound signal into the character code data;

a display step for displaying data; and a control step performed as part of said speech recognition step for controlling an operation of said speech recognition step, wherein when it is found that a sound signal is re-entered using said talk switch a predetermined number of times in said control step and the speech recognition step fails to recognize the name, said control step controls said display step to display a candidate list of names from which one name is selected by a user.

8. A speech recognition method as claimed in claim 7, further comprising:

a sound generating step for generating sound, wherein said control step controls said sound generating step to generate a sound to alert the user of said list of words to be selected.

* * * * *